Sept. 8, 1959  M. D. STEPATH  2,903,554
CUTTING AND GOUGING TORCH
Filed Jan. 11, 1957  2 Sheets-Sheet 1
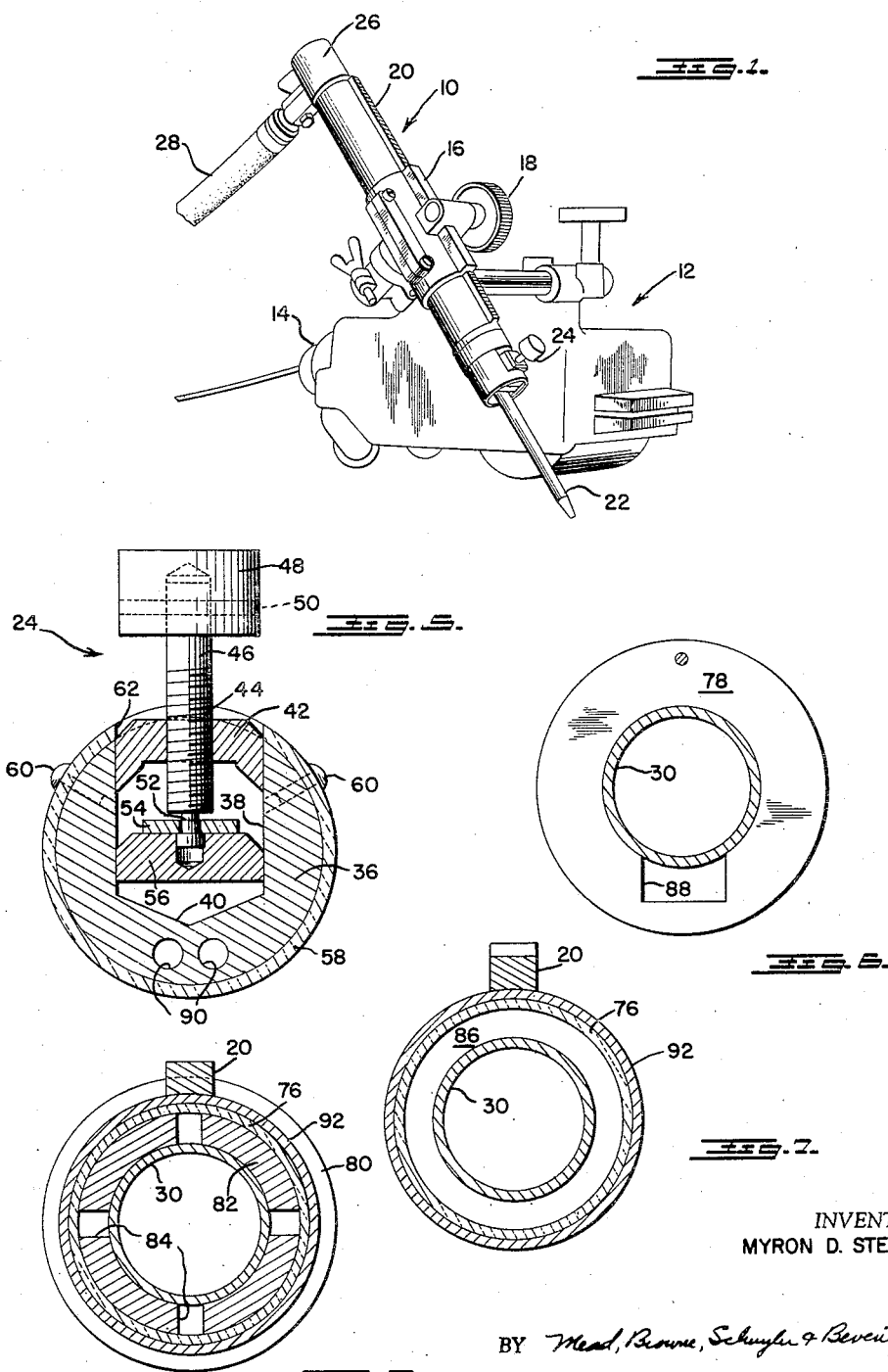
INVENTOR
MYRON D. STEPATH
BY Mead, Browne, Schuyler & Beveridge
ATTORNEYS

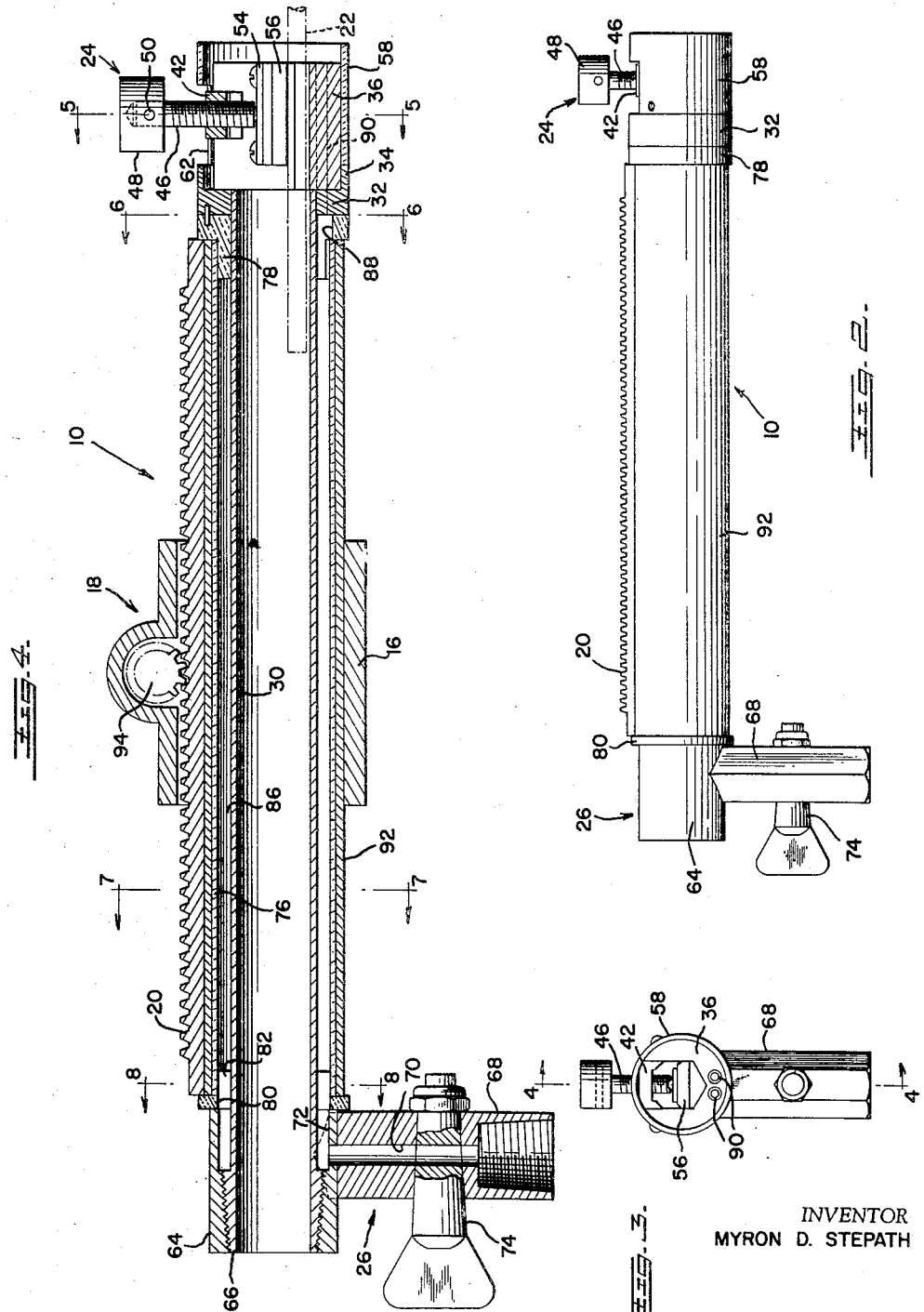

United States Patent Office 2,903,554
Patented Sept. 8, 1959

2,903,554

CUTTING AND GOUGING TORCH

Myron D. Stepath, Lancaster, Ohio, assignor to Arcair Company, Lancaster, Ohio, a partnership Application January 11, 1957, Serial No. 633,626

5 Claims. (Cl. 219—69)

This invention relates to electric arc-gas jet cutting and gouging apparatus and more particularly to an improved electrode holder or torch.

The electric arc-gas jet cutting and gouging process has found many applications in the metal working industry where a rapid and efficient method for cutting and gouging of metal by use of ordinary solid-rod electrodes is required. In this process, the metal is melted by the application of an electric arc established with a conventional electrode. A high velocity stream of gas jet is directed lognitudinally along the electrode and forcibly removes the molten metal created by the arc before the metal can harden. By this process, clean and uniform cuts or grooves may be rapidly and efficiently formed in the metal. A more detailed description of the electric arc-gas jet cutting and gouging process may be found in Stepath et al. Patent No. 2,706,236, granted on April 12, 1955.

It is sometimes desirable to employ in this process an electrode holder wherein the electrode is mounted to project longitudinally from the holder as in the case of an electrode holder for mounting on a movable carriage in automatic cutting and gouging operations.

Since prior art electric arc-gas jet torches are so constructed that little if any adjustment of the electrode longitudinally of the torch is possible, certain problems have arisen in relatiing the length of feeding stroke of the carriage to the length of the electrode. Where no relative longitudinal movement of the electrode and holder is possible, the length of the electrode and the length of the feeding stroke of the supporting carriage should be substantially equal. Where an electrode holder is adapted for use in an existing machine carriage, the electrode length must usually be modified to that of the feeding stroke. Usually the modified length is somewhat less than the standard electrode length, resulting in loss of time occassioned by the necessary modification of the electrode length and the necessity of frequent replacement as well as wastage of non usable scrap portions of the modified electrodes.

Conversely, modification of the carriage to increase its feeding stroke to accommodate a full standard length electrode is costly, and in many cases impractical.

One of the objects of my invention is to provide an electrode holder for cutting and gouging metal by the electric arc-gas jet process wherein a conventional solid electrode is supported longitudinally of the holder in any desired position of longitudinal adjustment relative to the holder.

Another object of my invention is to provide an electrode holder for cutting and gouging metal by the electric arc-gas jet process which is of relatively simple and rugged construction and requires a minimum of machining operations.

A related object of my invention is to provide electric arc-gas jet cutting and gouging apparatus which is especially adapted for use in machine cutting operations.

The torch of the present invention has a plurality of coaxially disposed elongated tubular members, the radially innermost of which is a hollow current carrying member having a clamp at one end for supporting an electrode in a position projecting longitudinally from the interior of the current carrying member. Surrounding and spaced from the current carrying member is a hollow tubular sleeve of electrical insulating material defining a chamber or passageway between the sleeve and the outer surface of the current carrying member. Mounted upon the outer surface of the sleeve is a metallic housing which may cooperate with the steady-rest or machine cutting equipment with which the torch is to be employed. The passage defined between the current carrying member and the insulating sleeve communicates at one end with suitably disposed orifices extending through the electrode clamp and oriented to direct a stream of gas longitudinally along the electrode. At the opposite end of the torch, a connector element, preferably including a regulating valve, supplies current to the current carrying member and a regulated flow of gas to the passage between the current carrying member and the insulating tube.

Other objects and advantages of my invention will become apparent by reference to the following specification taken in conjunction with the accompanying drawings.

In the drawings:

Fig. 1 is a perspective view of my improved electrode holder shown mounted for use on a conventional cutting machine carriage.

Fig. 2 is a side elevational view of the holder shown in Fig. 1.

Fig. 3 is an end view of the holder of Fig. 1 taken from the electrode supporting end of the torch with the electrode removed.

Fig. 4 is a longitudinal cross-sectional view of the electrode holder and mounting sleeve of Fig. 1 taken on the line 4—4 of Fig. 3.

Fig. 5 is a transverse cross-sectional view taken on the line 5—5 of Fig. 4

Fig. 6 is a transverse cross-sectional view taken on the line 6—6 of Fig. 4.

Fig. 7 is a transverse cross-sectional view taken on the line 7—7 of Fig. 4; and Fig. 8 is a transverse cross-sectional view taken on the line 8—8 of Fig. 4.

Referring first to Fig. 1, an electrode holder or torch designated generally by the numeral 10 is shown mounted upon a conventional travelling carriage 12 which is constructed to be guided in movement upon a suitably located track (not shown) in a manner well known to those skilled in the art. In the usual case, the carriage 12 is driven by some suitable means, such as an electric motor 14. As shown in Fig. 1, carriage 12 is provided with a sleeve 16 which slidably receives electrode holder 10. In the disclosed embodiment, sleeve 16 includes a manually rotatable pinion assembly 18 which engages rack 20 on electrode holder 10, whereby the electrode 22 and holder 10 may be advanced as a unit in electrode feeding movement. Electrode holder 10 is provided at its forward end with clamp means 24 for holding electrode 22 in position. At the opposite or rear end of electrode holder 10, a connector element 26 is provided for mating engagement with a cable 28 by means of which electric current and gas under pressure are supplied to holder 10.

Referring now to Fig. 4, it will be seen that the holder 10 is constructed primarily from a plurality of coaxially arranged tubular members. The innermost of these members is a hollow cylindrical current carrying member 30, which is constructed of a suitable electrical conducting material such as copper. At the forward (right-hand) end of member 30, an electrically conductive head member 32 is secured, as by brazing, to define a radially extending flange on the forward end of tube 30. An axially projecting lip 34 on member 32 defines an annular seat within which is secured the fixed or seat portion 36 of clamp assembly 24.

As best seen in Figs. 3 and 5, element 36 is formed with a radially extending slot 38 which extends downwardly from the upper surface of member 36 to a V-shaped electrode seat 40, the lower apex of which is aligned with the inner surface of current carrying member 30.

A retaining screw receiving bracket 42 extends across the opening at the upper end of slot 38, and is secured to the walls of the slot 38 by any suitable means, such as brazing. Bracket 42 is provided with a tapped hole 44 which threadably receives a retaining screw 46. For convenience in manipulating screw 46, a knob 48 is secured to the upper end of shaft 46 by a retaining pin 50. At the lower end of shaft 46, a flanged neck portion 52 is rotatably received within a retainer 54 secured to the upper surface of electrode-engaging block 56.

As best appreciated from a comparison of Figs. 4 and 5, retaining block 56 is of rectangular shape when viewed from above, and is thus guided in up and down movement by the walls of slot 38. By the foregoing construction, electrode 22 may be clamped in position in any desired longitudinal relationship to holder 10.

An annular sleeve 58 of electrical insulating material is fitted around the outer surface of member 36. Sleeve 58 is secured to member 36 as by bolts 60, and is provided with an opening 62 in its upper surface to permit operation of the clamping means 24.

Returning now to Fig. 4, connector element 26 is threadably secured to the rearward (left) end of current carrying member 30. As best seen in Fig. 4, connector element 26 includes a cylindrical end cap portion 64 which is internally threaded at 66 to threadably engage the end of member 30. A laterally extending projection 68 is secured, as by brazing, to one side of end cap 64 and is provided with an internal passageway 70 which extends completely through projection 68 to communicate with an enlarged internal diameter portion 72 located forwardly of threads 66 in the interior of end cap 64. A regulating valve assembly 74 of conventional construction is mounted in projection 68 to control the flow of gas through passageway 70. At its outer end, passage 70 is enlarged and provided with internal threads to receive the connecting element of a suitable conduit adapted to supply electric current to current carrying member 30 through projection 68 and end cap 64.

A hollow cylindrical sleeve 76 of electrical insulating material surrounds the major portion of the length of current carrying member 30 and is supported upon member 30 by front and rear collars 78 and 80, respectively, which are likewise constructed of electrical insulating material. Collar 80, as best seen in Fig. 8, includes an inner ring portion 82 engaging the outer circumference of current carrying member 30. Ring 82 is slotted as at 84 to provide fluid communication between passageway 70 in projection 68, and the annular chamber or passageway 86 which is located between the inner surface of sleeve 76 and the outer surface of current carrying member 30.

Collar 78 is slotted as at 88 to provide communication between passage 86 and longitudinally extending passages or orifices 90 which extend through element 32 and fixed element 36 of clamp assembly 24.

Orifices 90 are oriented to direct a stream of gas issuing from chamber 86 into a path flow along electrode 22. Preferably, gas within chamber 86 is maintained under substantial pressure and the jets of gas issuing from orifices 90 forcibly eject molten metal from the work piece as the metal is melted by the electric arc at the electrode tip. This process is described in detail in the abovementioned Stepath et al. Patent No. 2,706,236.

To adapt the torch for use in a suitable steady-rest or machine cutting environment, a metal housing 92 is mounted upon the outer surface of insulating sleeve 76. It will be noted that housing 92 is electrically insulated from the current carrying portions of the torch by the radially extending flanges of front and rear collars 78 and 80, as well as by the portions of collars 78 and 80 which serve to space insulating sleeve 76 from the current carrying member 30. In the particular embodiment illustrated, housing 92 is provided with a longitudinally extending rack generally indicated by the numeral 20, which engages a suitable pinion gear 94 within pinion gear assembly 18 on carriage 12. By means of pinion gear 94, the entire electrode holder may be reciprocated within sleeve 16 toward or away from the work.

In operation, a suitable conduit is coupled within the threaded bore at the end of projection 68 to supply electrical current to projection 68 and a gas, such as air, under pressure to passageway 70. Electric current is conducted through projection 68, end cap 64 and current carrying member 30 to the fixed element 36 of clamp assembly 24 to an electrode 22 supported in the position illustrated in hidden lines in Fig. 4 or as indicated in over-all view of Fig. 1.

Gas under pressure passes through passageway 70 and into chamber 86 through the slots 84 in rear mounting collar 80. At the forward end of passage 86, the gas under pressure passes through slot 88 in mounting collar 78 and thence through orifices 90 to be ejected along electrode 22 to forcibly remove molten metal from the work piece. The pressure of the gas may be regulated by adjustment of valve 74. Rotation of the shaft 46 of clamp assembly 24 permits longitudinal adjustment and replacement of the electrodes as required. During employment of the device in conjunction with the carriage 12 of Fig. 1, the torch assembly as a whole is moved by carriage 12 which, in the usual case, is guided upon tracks. During the operating movement of the electrode holder, feeding adjustment of the electrode is effected by manipulation of pinion assembly 18 which transmits movement to the holder through rack element 20.

While I have disclosed and described but one embodiment of my invention, it will be apparent to those skilled in the art that the disclosed embodiment is capable of modification. Therefore, the foregoing description is to be considered exemplary rather than limiting, and the true scope of my invention is that defined in the following claims.

What I claim as my invention is:

1. Electric arc-gas jet cutting and gouging apparatus comprising an elongated hollow housing, a collar of electrical insulating material mounted upon each end of said housing, an elongated open-ended current carrying member extending longitudinally through said housing and supported within said collars to define a longitudinally extending passageway between said housing and said current carrying member, means at the forward end of said current-carrying member for supporting an electrode in adjustable longitudinal relationship within said member, said electrode supporting means having an orifice extending from said passageway for directing a gas jet longitudinally along said electrode, and connector means at the rearward end of said housing for supplying electric current to said current carrying member and gas under pressure to said passageway.

2. Electric arc-gas jet cutting and gouging apparatus comprising an elongated hollow housing, an elongated hollow open-ended current carrying member extending longitudinally through said housing, means electrically insulating the housing from the current carrying member, means supporting said current carrying member within said housing to define a longitudinally extending passageway between said housing and said current carrying member, clamp means at the forward end of said current carrying member including a portion fixed with respect to the current carrying member defining an electrode supporting seat longitudinally aligned with the interior surface of said current carrying member, said fixed portion of said clamp means having an orifice extending from said passageway for directing a gas jet longitudinally along an electrode mounted in said clamp means, and connector means at the rearward end of said housing for supplying electric current to said current carrying member and gas under pressure to said passageway.

3. Electric arc-gas jet cutting and gouging apparatus comprising an elongated hollow open-ended current carrying member, seat means mounted at one end of said current carrying member for supporting an electrode disposed within the interior of said current carrying member in longitudinal projecting relationship thereto, means for maintaining said electrode in seating engagement with said seat means, connector means at the other end of said current carrying member for connecting said member to a source of electric current, a housing surrounding said current carrying member to define therewith a closed passageway extending from said connector means to said seat means, means electrically insulating the housing from the current carrying member means on said connector means for connecting said passageway to a source of gas under pressure, said seat means having an orifice extending from said passageway to discharge gas under pressure from said passageway in jets directed longitudinally along an electrode supported on said seat means.

4. Electric arc-gas jet cutting and gouging apparatus comprising a tubular housing, an open-ended tubular current carrying member disposed in spaced coaxial relationship within said housing to define a passageway therewith, said current carrying member projecting axially beyond the ends of said housing, a collar of electrical insulating material located at each end of said housing and supporting said current carrying member in the aforementioned relationship to said housing, the collar at one end of said housing including means defining an inlet to said passageway and the collar at the other end of said housing including means defining an outlet to said passageway, a connector element including an end cap mounted upon the projecting portion of said current carrying member at said one end of said housing and defining a closed chamber opening into said inlet to said passageway, means on said end cap for connecting said end cap to a source of electric current and for connecting said chamber to a source of gas under pressure, means at the other end of said current-carrying member for supporting an electrode in adjustable longitudinal relationship within said current carrying member, said electrode supporting means having an orifice in communication with said outlet of said passageway, said orifice means being aligned with said electrode supporting means to direct a gas jet longitudinally along an electrode supported in said electrode supporting means.

5. Electric arc-gas jet cutting and gouging apparatus comprising a solid electrode, an open-ended tubular electrode holder, electrode support means on said holder for supporting said electrode longitudinally within said holder at selected positions of longitudinal adjustment relative to said holder, said support means having an orifice located to direct gas jets along the sides of said electrode when supported in said electrode support, means for supplying electric current to said support and gas under pressure to said orifice means, means for moving said electrode across the surface of the work, and means for feeding said electrode holder toward and away from the work longitudinally with respect to the electrode.

References Cited in the file of this patent

UNITED STATES PATENTS

| | | |
|---|---|---|
| 1,746,208 | Alexander | Feb. 4, 1930 |
| 2,014,226 | Catlett | Sept. 10, 1935 |
| 2,063,467 | Southgate | Dec. 8, 1936 |
| 2,381,355 | Laughton, Jr. | Aug. 7, 1945 |
| 2,469,382 | Gayley | May 10, 1949 |
| 2,510,415 | Pitcher | June 6, 1950 |
| 2,612,584 | Morrissey | Sept. 30, 1952 |
| 2,723,332 | Peterson | Nov. 8, 1955 |
| 2,726,309 | Stepath | Dec. 6, 1955 |